United States Patent Office 3,133,037
Patented May 12, 1964

3,133,037
DISPERSING AMMONIUM BROMIDE IN STYRENE POLYMERS
Floyd B. Nagle and Elmer L. McMaster, Midland, Mich., assignors to The Dow Chemical Company, Midland, Mich., a corporation of Delaware
No Drawing. Filed Apr. 17, 1961, Ser. No. 103,248
6 Claims. (Cl. 260—41)

The present invention relates to a method of dispersing ammonium bromide in styrene polymer resin compositions and to self-extinguishing styrene resin compositions containing ammonium bromide as a flame-proofing agent.

By a "styrene polymer" is meant a solid polymer of one or more polymerizable styrene compounds. The polymeric resin comprises in chemically combined form at least 50 percent by weight of at least one styrene compound having the general formula:

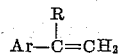

wherein Ar represents an aromatic hydrocarbon radical, or a nuclear alkyl or halo-substituted aromatic hydrocarbon radical, of the benzene series, and R is hydrogen or the methyl radical. Examples of such resins are the solid homopolymers of styrene, α-methylstyrene, ortho-methylstyrene, meta-methylstyrene, para-methylstyrene, ar-ethylstyrene, ar-vinylxylene, ar-chlorostyrene, the solid copolymers of two or more of such styrene compounds with one another; and solid copolymers of one or more of such styrene compounds with minor amounts of other readily polymerizable compounds such as divinylbenzene, methylmethacrylate, acrylonitrile, butadiene or copolymers or blends of styrene with minor proportions of natural or synthetic rubbers, etc.

The expressions "non-flammable," "flame-proof," and "self-extinguishing," as employed herein, mean incapable of burning or sustaining a flame for more than 15 seconds after a composition has been fully heated in an open flame and then removed from the flame used to heat the same.

The method of this invention may be used when either solid or cellular articles are made from styrene polymers. The styrene polymer may be made by any known method.

If cellular articles are desired, they may be formed by any known method. An especially suitable method is described in U.S. Patent No. 2,450,436. In that method, a volatile substance, commonly known as a blowing agent, is dissolved at superatmospheric pressure in a molten polymer to form a gel. A pressure from an inert gas may be superimposed on the system. The gel is passed into a cooled zone to lower the gel temperature below the critical temperature of the volatile substance and then is released through an aperture to atmospheric pressure. In so doing, the gel rapidly expands and solidifies due to the vaporization of the volatile substance. The article so produced consists of uniformly sized cells separated by thin walls of solid polymer. This article is strong and has excellent insulating properties. However, it is flammable, and as such, is undesirable as an insulating material wherever fire hazards must be avoided.

Self-extinguishing styrene compositions may be prepared by admixing particulated ammonium bromide having a particle size of from about 1 micron to about 50 microns with the resin in an amount sufficient to give the self-extinguishing characteristics desired. However, fine particle size ammonium bromide is not easily wet by molten resin formulations, and remains intact to pack together under pressure of extrusion. The resulting agglomerates or large particles cause the formation of specks or rough spots on the surfaces of fabricated articles. Various dispersants such as zinc stearate, Nopcowax (reaction product of ethylene diamine and commercial grade stearic acid) and calcium silicate were used in attempts to prevent the agglomeration of the fine particle size ammonium bromide, but proved unsuccessful.

We have now discovered that emulsion latexes of styrene resins may be used to prepare concentrates of ammonium bromide which may be fed back into high molecular weight polymer, i.e. normally solid or molding grade, in conventional plastics mixing equipment to produce an excellent dispersion of ammonium bromide in the molded, extruded or foamed product. The latexes useful in the present invention are those made from styrene resins having solution viscosities of from about 8 to about 150, preferably 8 to 30, centipoises (10 percent in toluene). The concentrates of the present invention may contain up to 70 weight percent ammonium bromide, and the final product may contain any desired amount of flame-proofing agent up to about 15 weight percent.

The concentrates of this invention may be prepared by dissolving the ammonium bromide in distilled water and mixing the resulting solution with a solution of a corrosion inhibitor such as the diethyl amine salt of a 50–50 mixture of the mono- and di-octylphenyl esters of phosphoric acid and a solubilizer such as Tween 20 (a polyoxyethylene sorbitan monolaurate). The desired latex is stabilized with a di-secondary butyl phenyl ether of a polyethylene glycol having an average molecular weight of about 2000 and then mixed with the ammonium bromide solution for spray drying.

In practicing the present invention we have found it desirable to employ only compatible resin latexes when forming the concentrates. For example, when it is desired to disperse ammonium bromide in a copolymer of styrene and methyl methacrylate the preferable latex is formed from a copolymer of styrene and methyl methacrylate. Similarly, a copolymer of styrene and acrylonitrile is perferably used to form the concentrate for dispersing ammonium bromide in a high molecular weight copolymer of styrene and acrylonitrile.

The present invention may be further illustrated, but is not to be construed as limited by the following examples.

Example I

A mixture of 6300 grams of ammonium bromide, 11,700 grams of distilled water, 78.75 grams of the diethyl amine salt of a 50–50 mixture of the mono- and di-octylphenyl esters of phosphoric acid, 45.0 grams of a polyoxyethylene sorbitan monolaurate, 270 grams of a di-secondary butyl phenyl ether of a polyethylene glycol stabilizer and 5400 grams (2700 grams solids) of an emulsion latex of polystyrene having a 10 percent solution viscosity of 8.8 centipoises was spray dried on a Niro-Drier at an inlet temperature of 350° C. and an outlet temperature of 80° to 85° C. The yield of solid product was 7,632 grams of material containing 69.1 weight percent ammonium bromide, 0.69 weight percent of the diethyl amine salt of a 50–50 mixture of the mono- and di-octylphenyl esters of phosphoric acid, 29.62 weight percent polystyrene and 0.59 weight percent of a di-secondary butyl phenyl ether of a polyethylene glycol stabilizer. A composition of 0.43 pound of the above concentrate, 0.03 pound dibutyl tin oxide and 14.54 pounds of high molecular weight polystyrene was blended for 25 minutes and extruded through a Welding Engineers screw extruder at a jacket temperature of 200° C., screw speed of 35 r.p.m. and a feed rate of 33 pounds per hour. The extrudate was particulated and injection molded. Dispersion of ammonium bromide was excellent and the moldings were self-extinguishing.

Example II

A solid spray-dried concentrate containing 68.9 weight percent ammonium bromide was prepared in a manner similar to that of Example I using a polystyrene latex having a solution viscosity of 27.9 centipoises (10 percent in toluene). A molding composition containing 0.43 pound of the above concentrate, 0.03 pound of calcium nuolate and 14.54 pounds of molding grade polystyrene was blended for ½ hour and then extruded and molded as in Example I. The resulting product was self-extinguishing and the dispersion of ammonium bromide was excellent.

*Example III*

In a manner similar to that of the above examples, 245.1 grams of a spray-dried concentrate containing 48.95 weight percent ammonium bromide, and 48.95 weight percent of solids from a latex of a copolymer of 75 weight percent styrene and 25 weight percent α-methyl styrene, having a solution viscosity of 24 centipoises (10 percent in toluene), and 1.26 weight percent of the above stabilizer were blended with 1754.9 grams of a molding grade copolymer of 75 weight percent styrene and 25 weight percent α-methyl styrene and the blend extruded. The product was particulated and molded. The injection moldings were self-extinguishing and the dispersion of ammonium bromide was excellent.

*Example IV*

Excellent dispersions of 6 weight percent $NH_4Br$ in polyvinyltoluene were similarly obtained employing spray-dried concentrates of ammonium bromide and polystyrene.

*Example V*

A spray dried concentrate containing 5 parts ammonium bromide and 5 parts polystyrene prepared as in the above examples was blended with 1 part tricresyl phosphate and 89 parts of a copolymer of 95 weight percent polystyrene and 5 weight percent of a rubbery copolymer of 77 weight percent butadiene and 23 weight percent styrene, the blend extruded and the product particulated and molded. The dispersion of ammonium bromide was excellent.

Ammonium bromide may be dispersed in copolymers of styrene compounds with 2 to 15 weight percent of natural rubbers or synthetic rubbery copolymers containing 40 to 80 weight percent of butadiene and, correspondingly, 60 to 20 weight percent of styrene compounds in a similar manner.

Various modifications may be made in the present invention without departing from the spirit or scope thereof, and it is understood that we limit ourselves only as defined in the appended claims.

This application is a continuation-in-part of our copending application S.N. 824,205, filed July 1, 1959, now abandoned.

What is claimed is:

1. The method of uniformly dispersing ammonium bromide having particle sizes in the range of 1 to 50 microns in styrene polymers, said polymers containing in chemically combined form at least 50 weight percent of at least one styrene compound having the general formula:

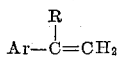

wherein Ar represents an aromatic radical of the group consisting of hydrocarbon and halohydrocarbon radicals of the benzene series and R is a member of the group consisting of hydrogen and the methyl radical, and not more than 50 weight percent of another ethylenically unsaturated monomer copolymerizable therewith, comprising forming a spray dried concentrate of the ammonium bromide and a latex of the styrene polymer, said concentrate containing up to 70 weight percent of ammonium bromide, and mixing the concentrate with the styrene polymer.

2. The method of claim 1 wherein the styrene polymer has a solution viscosity (10 percent in toluene) of from about 8 to about 30 centipoises.

3. The method of claim 1 wherein the styrene polymer is polystyrene.

4. The method of claim 1 wherein the styrene polymer is a copolymer of about 75 weight percent styrene and 25 weight percent α-methyl styrene.

5. Method of claim 1 wherein the styrene polymer is polyvinyltoluene.

6. Method of claim 1 wherein the styrene polymer is a copolymer of styrene with a rubbery copolymer of styrene and butadiene.

No references cited.